(12) United States Patent
Kwon et al.

(10) Patent No.: US 11,309,605 B2
(45) Date of Patent: Apr. 19, 2022

(54) HIGH VOLTAGE BATTERY RACK

(71) Applicant: SK INNOVATION CO., LTD., Seoul (KR)

(72) Inventors: Dae Won Kwon, Daejeon (KR); Yong Uk Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 397 days.

(21) Appl. No.: 16/394,778

(22) Filed: Apr. 25, 2019

(65) Prior Publication Data

US 2019/0334142 A1    Oct. 31, 2019

(30) Foreign Application Priority Data

Apr. 26, 2018   (KR) .................. 10-2018-0048502

(51) Int. Cl.
| | |
|---|---|
| *H01M 50/502* | (2021.01) |
| *H01M 10/48* | (2006.01) |
| *H01M 50/20* | (2021.01) |
| *H01M 10/42* | (2006.01) |
| *H01M 50/581* | (2021.01) |

(52) U.S. Cl.
CPC ......... *H01M 50/20* (2021.01); *H01M 10/425* (2013.01); *H01M 10/48* (2013.01); *H01M 50/502* (2021.01); *H01M 50/581* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2016/0204401 A1* | 7/2016 | Curtis | H01M 50/20 429/153 |
| 2017/0162853 A1* | 6/2017 | Guen | H01M 50/502 |
| 2018/0241102 A1* | 8/2018 | Kim | H01M 10/6568 |
| 2019/0036101 A1* | 1/2019 | Tyler | H01M 50/502 |
| 2019/0131805 A1* | 5/2019 | Rush | H02J 7/0034 |

FOREIGN PATENT DOCUMENTS

KR        10-1584295       1/2016

* cited by examiner

*Primary Examiner* — Tracy M Dove
(74) *Attorney, Agent, or Firm* — IP & T Group LLP

(57) ABSTRACT

The present invention provides a high voltage battery rack, including: a plurality of battery modules electrically connected with each other; and a rack controller configured to control the plurality of battery modules, wherein each of the plurality of battery modules comprises: external terminals; and an MSD module configured to determine whether a voltage is applied to the external terminals during operation.

10 Claims, 8 Drawing Sheets

HIGH VOLTAGE BATTERY RACK

CROSS-REFERENCE TO RELATED APPLICATION

This application claims priority to Korean Patent Applications No. 10-2018-0048502 filed on Apr. 26, 2018 in the Korean Intellectual Property Office (KIPO), the entire disclosure of which is incorporated by reference herein.

BACKGROUND OF THE INVENTION

1. Field of the Invention

Embodiments of the invention relate to a high voltage battery rack.

2. Description of the Related Art

In an energy storage system (ESS), a plurality of battery modules in module (tray) unit including a plurality of battery cells are stacked to form a battery rack, then a plurality of these battery racks are electrically connected with each other to produce one battery system. Due to a method of connecting a lot of battery cells and battery modules are connected in series with each other, the ESS has characteristics in which a very high voltage is applied thereto.

As described above, unlike a typical battery pack built in an electric vehicle or a hybrid vehicle, since a voltage of several to several tens of times higher than that of the typical battery pack is applied to the ESS, there is a risk such as a fire or explosion, and a damage scale thereof is significantly larger than that of the typical battery pack. Therefore, it is necessary for the ESS to pay attention in stability.

In particular, during producing the ESS, the battery racks are often transported and installed in battery module units. At this time, since a high voltage is applied to external terminals of the battery module, there is a risk of accidents such as a short-circuit and a ground fault in this state.

Further, in a case of a conventional high voltage battery rack, in order to prevent a short-circuit accident in module unit, an expensive separate fuse is generally used in each of the battery modules. However, in this case, since the fuse takes up much space in the battery module, energy efficiency may be reduced and manufacturing costs may be increased. As an example of the prior art, Korean Patent Registration No. 10-1584295, which is registered on Jan. 25, 2016, discloses a battery system having a rack structure in which a plurality of rechargeable trays are arranged and fastened in a horizontal direction, however, still has lack of improvement in relation to safety and maintenance.

SUMMARY OF THE INVENTION

It is an object of the embodiments of the present invention to provide a high voltage battery rack for an ESS and a battery module capable of securing safety environments for an operator by determining whether a high voltage is applied to external terminals during transportation, installation and maintenance of the battery modules in module unit.

In addition, another object of the embodiments of the present invention is to provide a high voltage battery rack for an ESS and a battery module, which may manually and easily operate, as well as visually confirm whether a high voltage is applied to external terminals of the battery module, therefore safety for an operator may be improved during transportation and installation of the battery modules.

Further, another object of the embodiments of the present invention is to provide a high voltage battery rack for an ESS and a battery module having a double safety device in which contactors of an entire rack controller may be switched off by opening an MSD module when high voltage external terminals are exposed to an outside in the battery module.

Further, another object of the embodiments of the present invention is to provide a high voltage battery rack for an ESS and a battery module, which have a fusing bus bar capable of serving as both a bus bar and a fuse in each battery module, such that it is unnecessary to provide a separate expensive fuse for preventing a safety accident when an internal short-circuit or overcurrent occurs.

Further, another object of the embodiments of the present invention is to provide a high voltage battery rack for an ESS and a battery module capable of preventing a secondary short-circuit accident that may occur after a fusing bus bar is ruptured.

Furthermore, another object of the embodiments of the present invention is to provide a high voltage battery rack for an ESS and a battery module, in which the ruptured state of the fusing bus bar may be visually confirmed, thereby improving the convenience and safety in management.

To accomplish the above described objects, according to an aspect of the present invention, there is provided a high voltage battery rack, including: a plurality of battery modules electrically connected with each other; and a rack controller configured to control the plurality of battery modules, wherein each of the plurality of battery modules includes: external terminals; and an MSD module configured to determine whether a voltage is applied to the external terminals during operation.

The MSD module may be manually operated by a user.

The MSD module may be exposed to an outside of the battery module.

The rack controller may include contactors which connects the plurality of battery modules and the external device to form a current path therebetween.

When breaking a voltage applied to the external terminal by the MSD module, the contactor of the rack controller may break the current path between the plurality of battery modules and the external device.

Each of the plurality of battery modules may include a plurality of battery cells stacked on each other.

Each of the plurality of battery modules may include a cell connection unit which electrically connects the plurality of battery cells with each other, the cell connection unit may include a rupture part having an opening formed in at least a portion thereof, and when a short-circuit occurs in each of the plurality of battery modules, the rupture part may be ruptured. Each of the plurality of battery modules may further include a fusing bus bar cover made of an insulation material and located at an outer surface of the fusing bus bar.

Each of the plurality of battery modules may further include a rear cover member located at an outermost side of the fusing bus bar, and the rear cover member may include an opening part formed therein to confirm a state of the fusing bus bar from an outside and prevent a second short-circuit.

A cell cover member may be disposed between the fusing bus bar and the plurality of battery cells to protect the battery cells from a rupture of the fusing bus bar.

The fusing bus bar may be located on one of both sides in a direction in which the plurality of battery cells are stacked in the plurality of battery modules.

The rack controller may include a rack fuse located on a current path between the plurality of battery modules and the external device.

According to an aspect of the present invention, there is provided a battery module for an energy storage system (ESS) having a plurality of battery cells, the battery module including: external terminals; an MSD module connected to the external terminals to determine whether a voltage is applied to the external terminals during operation; a fusing bus bar which connects the external terminals and at least a part of the plurality of battery cells or the plurality of battery cells; and a BMS module coupled to the MSD module.

A plurality of battery modules may be stacked to form a battery rack, and the BMS module may be connected to a rack controller located in the battery rack, and when the MSD module is opened, may break an electrical connection of a contactor which connects the battery rack and an external device to form a current path therebetween.

According to the embodiments of the present invention, it is possible to secure safety environments for an operator by determining whether a high voltage is applied to external terminals during transportation, installation and maintenance of the battery modules in module unit.

In addition, according to the embodiments of the present invention, it is possible to manually and easily operate, as well as visually confirm whether a high voltage is applied to external terminals of the battery module, therefore safety for an operator may be improved during transportation and installation of the battery modules.

In addition, according to the embodiments of the present invention, it is possible to provide a double safety device in which the contactors of the entire rack controller may be switched off by opening the MSD module when high voltage external terminals are exposed to an outside in the battery module.

According to the embodiments of the present invention, each of the battery module may be provide with a fusing bus bar capable of serving as both a bus bar and a fuse, such that it is unnecessary to provide a separate expensive fuse for preventing a safety accident when an internal short-circuit or overcurrent occurs.

In addition, according to the embodiments of the present invention, it is possible to prevent a secondary short-circuit accident that may occur after the fusing bus bar is ruptured.

In addition, according to the embodiments of the present invention, the rupture state of the fusing bus bar may be visually confirmed, thereby improving the convenience and safety in management.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
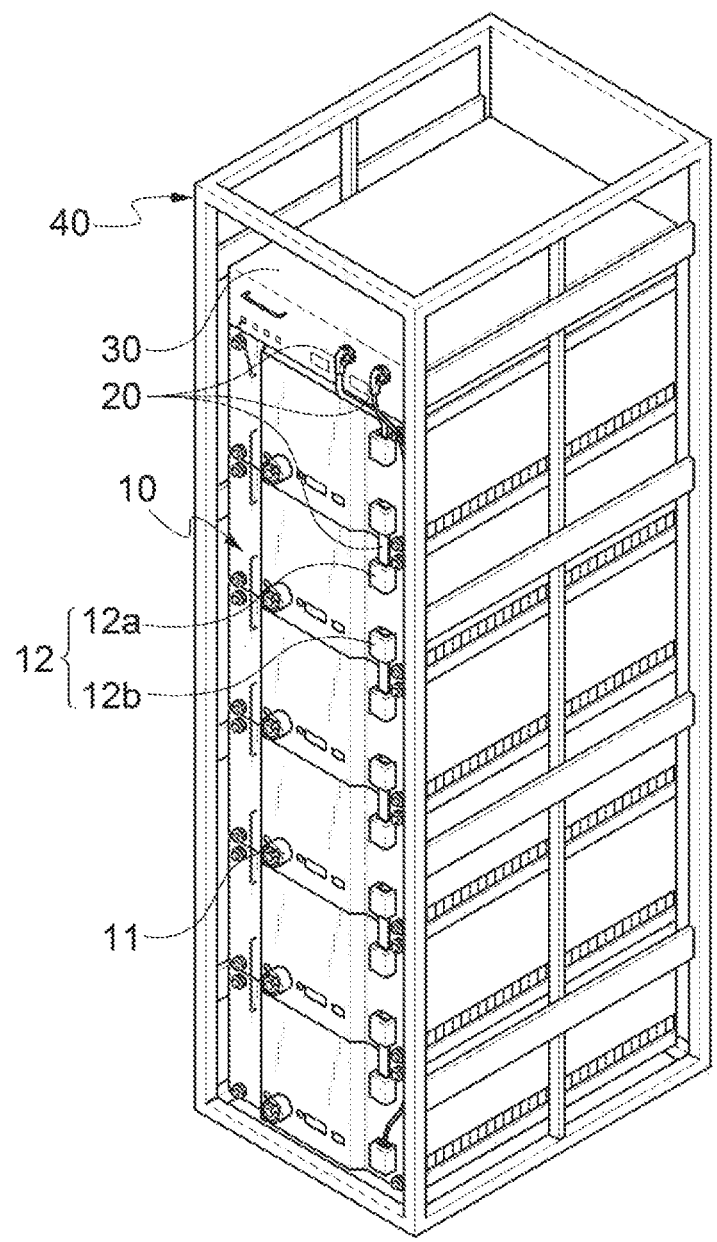
FIG. 1 is a perspective view illustrating a high voltage battery rack according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 2:
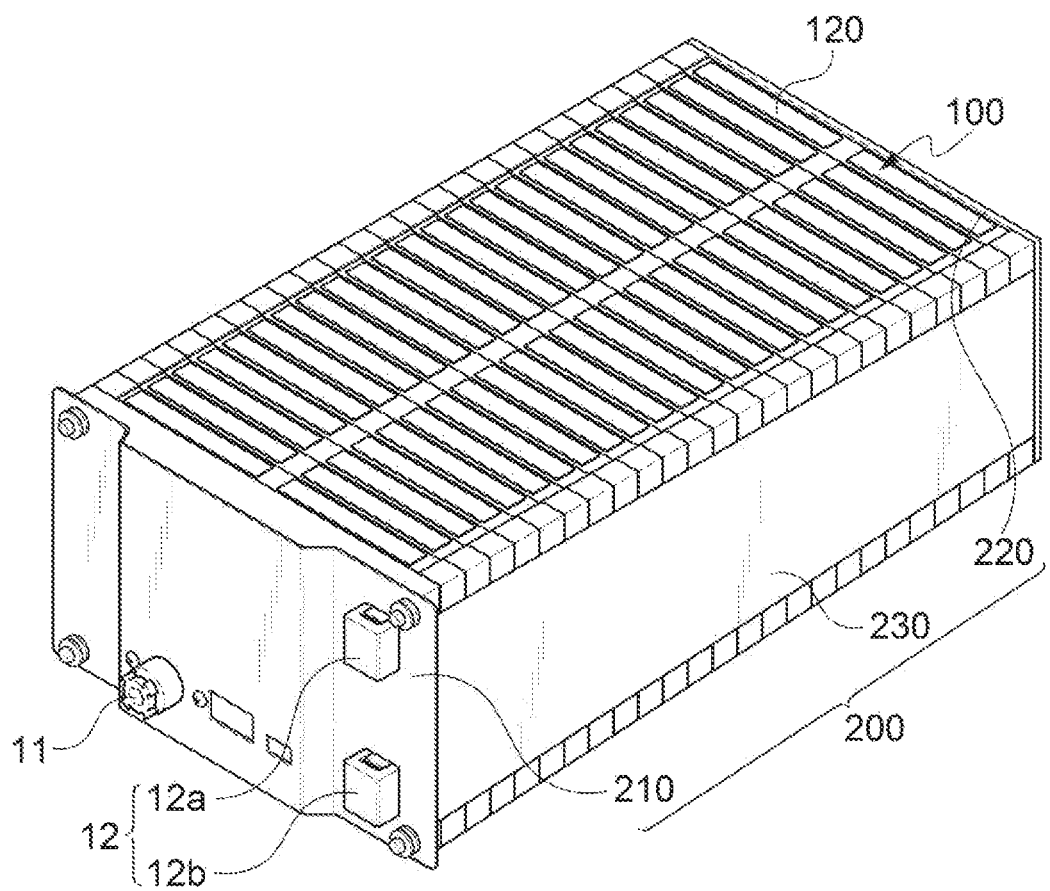
FIG. 2 is a perspective view of a battery module included in the high voltage battery rack according to the embodiment of the present invention as seen from the front.

FIG. 1 is a perspective view illustrating a high voltage battery rack 1 according to the embodiment of the present invention, and FIG. 2 is a perspective view illustrating a battery module 10 included in the high voltage battery rack 1 according to the embodiment of the present invention as seen from the front.

Referring to FIGS. 1 and 2, the high voltage battery rack 1 according to the embodiment of the present invention may include a plurality of battery modules 10 electrically connected with each other, and a rack controller 30 configured to control the plurality of battery modules 10. The plurality of battery modules 10 may be stacked and located within the housing 40.

At this time, the plurality of battery modules 10 may include external terminals 12, and the plurality of battery modules 10 may be electrically connected with each other by a connection member 20 which may be connected to the external terminals 12, thereby enabling the battery modules to supply a high voltage. Preferably, the plurality of battery modules 10 are connected with each other in series or in parallel, thereby forming a high voltage battery rack 1 according to the embodiment of the present invention. At this time, the connection member 20 may be a cable type, but it is not limited thereto, and may be formed as a bus bar, as well as the cable and the bus bar may be used together.

Further, each of the plurality of battery modules 10 may further include a manual service device (MSD) module 11 which is operated by a user or an operator to determine whether a voltage is applied to the external terminals 12.

In this case, the MSD module 11 may be mounted on a module switch part (illustrated in FIG. 4) that may be manually operated by the user or operator and may be electrically connected to a high voltage connection member (also illustrated in FIG. 4), which will be described below, to break an electrical connection of a high voltage connection member 410, and in this state, it is possible to apply the voltage to the external terminals 12 of the high voltage connection member 410. The high voltage connection member 410 and the module switch part 11*a* will be described in detail below.

Meanwhile, the MSD module 11 may be exposed to the outside of the battery module 10. Thereby, the user may easily visually confirm opening/closing states of the MSD module 11 in the battery module 10. In addition, a state in which a high voltage of the battery module 10 is applied to the external terminals 12 may be intuitively confirmed, and a risk of safety accident due to being exposed to the high voltage during transportation and installation operations of the battery module 10 may be minimized.

In addition, the MSD module 11 may be formed in a detachable type that can be easily detached or attached to the battery module 10. Thereby, the user or operator may intuitively and easily operate the MSD module 11, and may confirm whether the voltage of the battery module 10 is applied to the external terminals 12 by simply conforming the attached or detached state of the MSD module 11, and thereby minimizing a possibility of an occurrence of the safety accident. However, the method of attaching and detaching the MSD module 1 is illustrated as an example, and it is not limited thereto. For example, any method may be used so long as the user or operator can intuitively sufficiently conform the opening/closing states, and preferably, a switching method is also used.

As described above, the battery module 10 of the battery rack 1 according to the embodiment of the present invention includes the MSD module 11. Therefore, the user or operator may break the high voltage connection state of the ESS system by a simple operation of the MSD module 11 when transporting, installing or maintaining the battery module 10 unit or the battery rack unit, and thereby an accident such as a short-circuit or ground fault due to being exposed to the high voltage may be prevented.

Further, when connecting to an external power management unit or an external device (illustrated in FIG. 3) such as other high voltage battery racks to be described below in the battery rack 1 unit including the plurality of battery modules 10, a risk to be charged/discharged without confirming stability of a DC line, or risk of an accident due to the connection with adjacent other high voltage battery racks may be prevented. Furthermore, the user or operator may conform the state of the exposed high voltage terminal and DC line integrity through the MSD module 11, thus to prevent the accident.

Meanwhile, the plurality of battery modules 10 may include a protective cover unit 200 which surround the plurality of battery cells 110 located therein, thereby protecting the battery cells from external foreign matters or the like. Specifically, the protective cover unit 200 may include a front cover unit 210, a rear cover unit 220, and side cover units 230 for protecting sides on which a plurality of bus bar members 310, which will be described below, are disposed in a direction in which the plurality of battery cells 110 are stacked.

Figure 3:
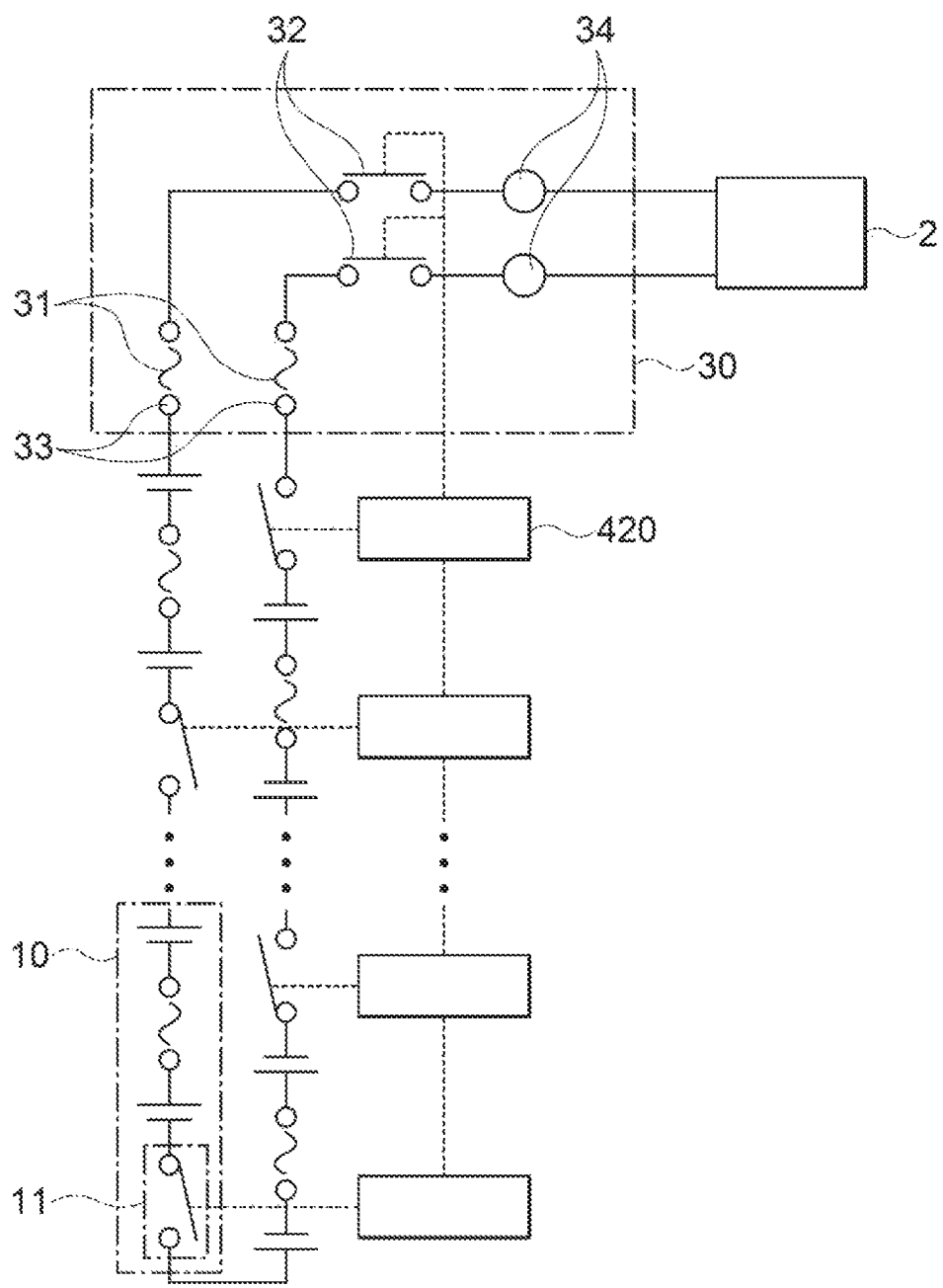
FIG. 3 is a circuit diagram illustrating an example of an electrical connection relationship of the high voltage battery rack according to the embodiment of the present invention.

FIG. 3 is a circuit diagram illustrating an example of an electrical connection relationship of the high voltage battery rack 1 according to the embodiment of the present invention.

Referring to FIG. 3, the rack controller 30 of the high voltage battery rack 1 according to the embodiment of the present invention may include contactors 32 that can electrically connect module terminals 33 on the battery module 10 side and rack terminals 34, to which the external power management unit (PCS) or the external device 2 such as other high voltage battery rack is connected, with each other.

Specifically, the contactor 32 may be formed in a switch type, and are normally in contact with both the module terminal 33 and the rack terminal 34 to electrically connect the terminals with each other to form a current path therebetween (the contactor 32 is closed). When breaking a voltage applied to the external terminal 2 by the MSD module 11, the contactor 32 of the rack controller 30 breaks the current path between the plurality of battery modules 10 and the external device 2.

On the other hand, when releasing the contact state of the contactor 32 with any one of the module terminal 33 or the rack terminal 34, the high voltage battery rack 1 according to the embodiment of the present invention may be maintained in an isolation state in which the terminals are not electrically connected with the external power management unit (PCS) or the external device 2 such as other high voltage battery racks (the contactor 32 is opened).

Thereby, the operator may prevent the risk of an occurrence of a safety accident due to mis-wiring during connecting the high voltage battery racks 1 with each other, or during connecting the high voltage battery rack 1 according to the embodiment of the present invention with the external power management unit.

Meanwhile, in the high voltage battery rack 1 according to the embodiment of the present invention, when the MSD module 11 located in each of the plurality of battery modules 10 is opened, the contact state of contactor 32 with at least one of the module terminal 33 and the rack terminal 34 is released, such that it may be converted from the closed state to the open state.

Specifically, each of the plurality of battery modules 10 may include a battery management system (BMS) module 420 capable of controlling each of the battery modules 10. The plurality of BMS modules 420 may be connected with each other. At this time, the plurality of BMS modules 420 may be connected to the rack controller 30 to transmit and receive electric control signals with each other. The BMS modules 420 may be connected with the MSD module 11 located in each battery module 10 via a cable or the like, may confirm the open and closed states of the MSD module 11 to transmit opening and closing signals of the MSD module 11 to the rack controller 30.

That is, during installing the high voltage battery rack 1 according to the embodiment of the present invention and connecting it with an external battery rack or the power management unit, the operator may merely separate any one MSD module 11 of the plurality of battery modules 10 included in the high voltage battery rack 1 according to the embodiment of the present invention from the battery modules 10 or may open a switch. In this case, the BMS module 420 of the battery module 10 may monitor the state of the MSD module 11 to transmit status information thereon to the rack controller 30, such that the contact state with the contactor 32 may be released and the voltage applied to the rack terminal 34 may be broken.

As described above, the high voltage battery rack 1 according to the embodiment of the present invention does not only break the high voltage applied to the battery module 10 when operating the MSD module 11 located in any one of the battery modules 10, but also break the voltage applied to the rack terminal 34 of the high voltage battery rack 1 according to the embodiment of the present invention. Therefore, it is possible to implement a double safety structure and minimize the probability of occurrence of a safety accident when installing and managing the high voltage battery rack 1 which is highly possible that an accident occurs due to the high voltage.

Meanwhile, the power management unit may supply electric power to a power plant, a substation, a transmission line, or the like in an external system, or may charge the plurality of battery modules 10 using the power supplied from the external system. Further, the power management unit may also include a power conversion unit (PCU) to control the charging and discharging of the power.

Figure 4:
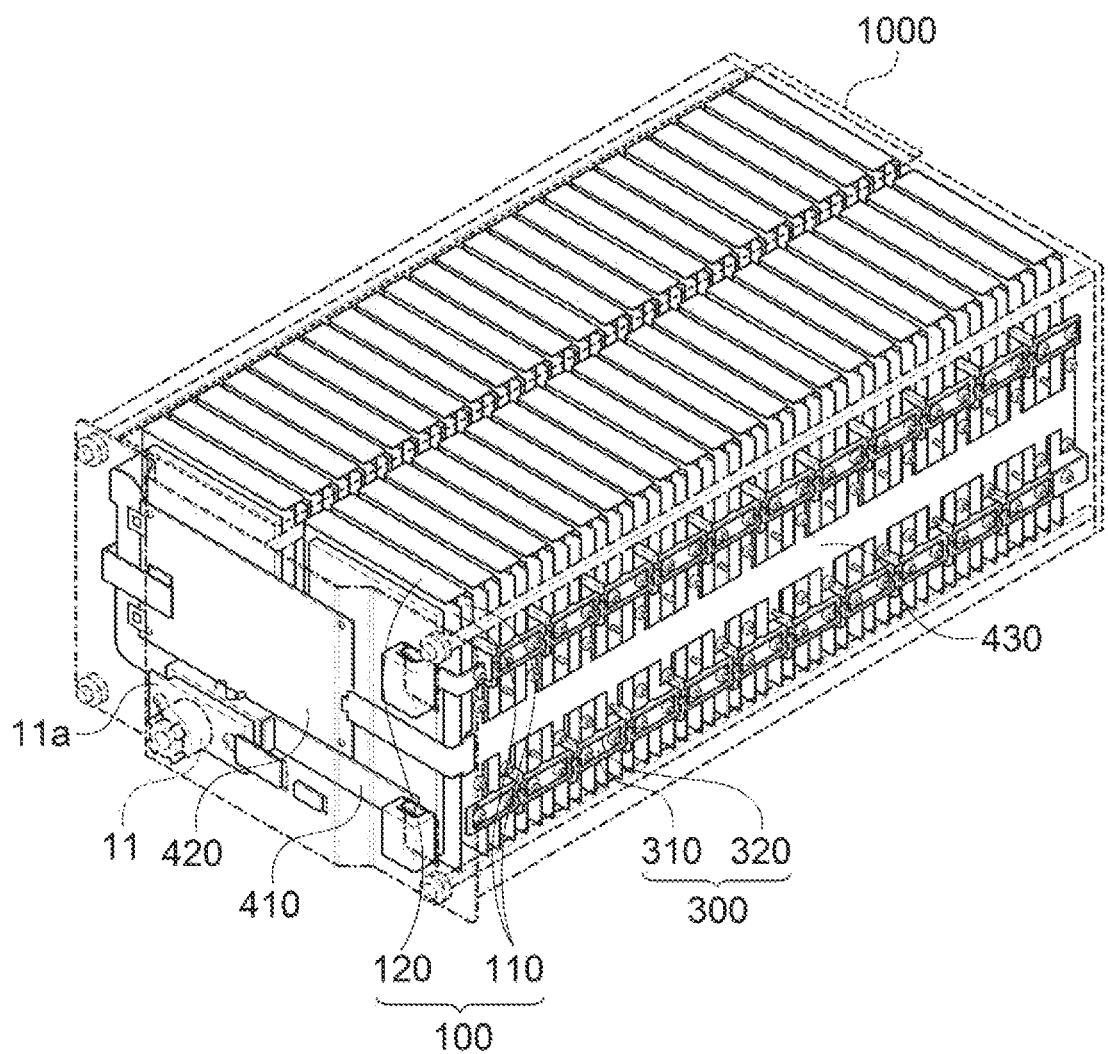
FIG. 4 is a perspective view illustrating an internal configuration of the battery module included in the high voltage battery rack according to the embodiment of the present invention as seen from the front.

FIG. 4 is a perspective view illustrating an internal configuration of the battery module 10 included in the high voltage battery rack 1 according to the embodiment of the present invention as seen from the front. Meanwhile, for the convenience of description, components such as the front cover unit 210, the rear cover unit 220, the plurality of battery cells 110 in the battery module 10, and a frame for fixing a cooling member 120 are not illustrated in FIG. 4.

Referring to FIG. 4, the plurality of battery modules 10 of the high voltage battery rack 1 according to the embodiment of the present invention may include the plurality of battery cells 110 stacked and electrically connected with each other. The plurality of battery modules 10 may further include a cell connection unit 300 which electrically connects the plurality of battery cells 110 with each other.

Specifically, the battery module 10 may include a plurality of battery submodules 100 formed by clustering at least two battery cells 110 with the cooling member 120 interposed therebetween. At this time, at least two battery cells 110 in one battery submodule 100 may be connected in parallel with each other.

In addition, the cell connection unit 300 may include the plurality of bus bar members 310 which electrically connect two adjacent battery submodules 100 among the plurality of battery submodules 100. Thereby, the plurality of battery submodules 100 are connected with each other in series or in parallel, such that one battery module 10 may be formed. FIG. 4 illustrates a state in which the plurality of battery submodules 100 are connected with each other in series by the bus bar member 310. At this time, since the bus bar member 310 is connected to electrode taps of at least two battery cells 110 in the battery submodule 100, the plurality of bus bar members 310 are located on both sides based on a direction in which the plurality of battery cells 110 are stacked; That is, the plurality of battery cells 110 may be arranged in a line on both sides of the battery module 10, and then may be electrically connected with each other to form two battery groups 1000.

In addition, the cell connection unit 300 may further include a bus bar frame 320 surrounding the plurality of bus bar members 310. The bus bar frame 320 may be made of an insulation material such as plastic, thus to block the possibility of a short-circuit between the bus bar members 310.

Meanwhile, the battery module 10 may further include a circuit unit 430 connected to the plurality of battery submodules 100 to measure and confirm voltage and temperature levels of the plurality of battery submodules 100. At this time, a sub-module fuse and a temperature sensor may be respectively provided at portions connected with the plurality of battery submodules 100 in the circuit unit 430.

Further, the circuit unit 430 may be located on both sides (i.e., side faces of the battery module 10) based on the direction in which the plurality of battery cells 110 are stacked, and may be connected to the BMS module 420, such that voltage level information, etc., of the battery submodules 100 may be transmitted to the BMS module 420 and the rack controller 30.

Meanwhile, the MSD module 11 may be located on one side of front and rear of the battery module 10. That is, the MSD module 11 may be located on one side of the direction in which the plurality of battery cells 110 are stacked. Preferably, the MSD module 11 may be located in front of the battery module 10, the operators may easily confirm the state of the MSD module 11 and operate the same.

At this time, the MSD module 11 may be located in front of the battery module 10 with being connected to the circuit units 430 on both sides of the battery module 10. Further, when the plurality of battery modules 10 are connected in series with each other on both sides of the battery module 10, one end of the MSD module 11 may be connected to one of two battery groups 1000 on both sides of the battery module 10, and the other end may be located close to the high voltage connection member 410 extending to the battery group 1000 side.

For example, the external terminal 12 of the battery module 10 may include a first terminal 12a and a second terminal 12b having different polarities from each other. Cathode portions of the plurality of battery cells 110 located in any one of the battery groups 1000 on both sides of the battery module 10 may be connected to the first terminal 12a located in front of the battery module 10, and anode portions of the plurality of battery cells 110 located in the other of the battery groups 1000 on both sides of the battery module 10 may be connected to the second terminal 12b through the high voltage connection member 410.

That is, two external terminals 12 having polarities different from each other in each of the battery modules 10 may be located together on one edge of the front surface of the battery module 10 through the high voltage connection member 410. Accordingly, the operation may be easily performed during installing the high voltage battery rack 1 according to the embodiment of the present invention and connecting the plurality of battery modules 10.

Further, the high voltage connection member 410 in front of the battery module 10 may include a module switch part 11a provided on at least a portion thereof, which is located on the high voltage connection member 410 to determine whether a voltage is applied to the second terminal 12b connected to the high voltage connection member 410.

Further, the MSD module 11 is detachably mounted on the module switch part 11a in the detachable manner. Therefore, when the MSD module 11 is attached to the module switch part 11a, the voltage may be applied to the second terminal 12b of the high voltage connection member 410, and when the MSD module 11 is detached from the module switch, the voltage applied to the terminal 12b of the high voltage connection member 410 may be broken.

Specifically, the module switch part 11a may have a mounting hole (not illustrated) formed therein, into which the MSD module 11 can be inserted and mounted, and mounting hole terminals (not illustrated) may be formed on at least a portion of an inner circumference of the mounting hole. At this time, MSD terminals (not illustrated) may be formed on at least a portion of the module switch part 11a of the MSD module 11 at positions corresponding to the mounting hole terminals. Accordingly, as the MSD module is inserted into the mounting hole of the module switch part 420 and rotated at a predetermined angle to be mounted on the module switch part 420, the mounting hole terminals and the MSD terminals come into contact with each other. Thereby, the voltage may be applied to the second terminal 12b of the high voltage connection member 410 (the module switch part 11a is closed). At this time, as the MSD module 11 is separated from the mounting hole, the applied voltage may be broken (the module switch part 11a is opened).

However, the above configuration is illustrated as an example, and it may be reversed whether the voltage is applied to the module switch part 11a as the MSD module 11 is mounted or separated. Further, as the MSD module 11 is opened or closed through an element such as a switch, the voltage may be applied to the second terminal 12b or broken.

Figure 5:
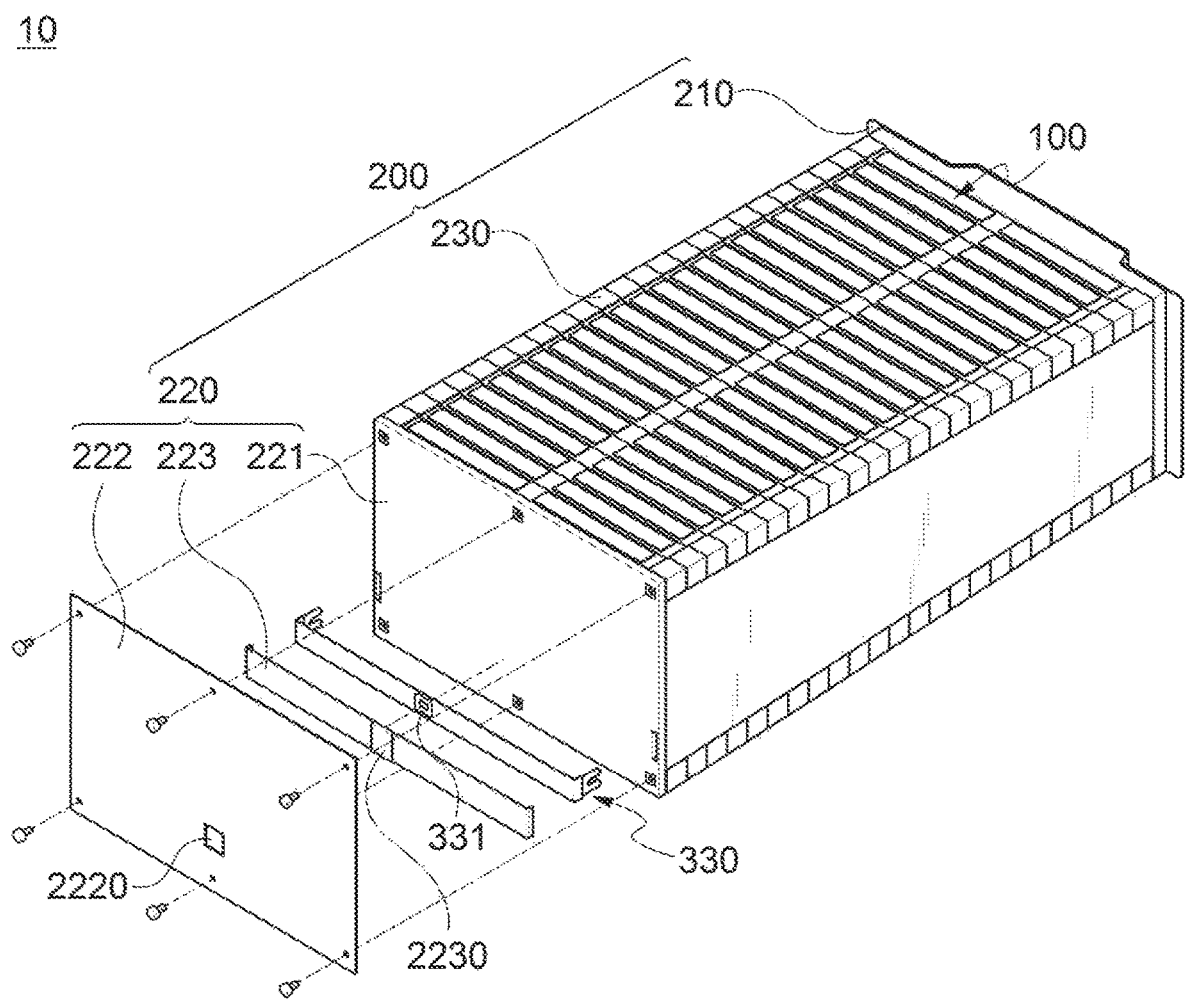
FIG. 5 is a perspective view illustrating a state in which the rear surface of the battery module included in the high voltage battery rack according to the embodiment of the present invention is disassembled as seen from the rear.
Figure 6:
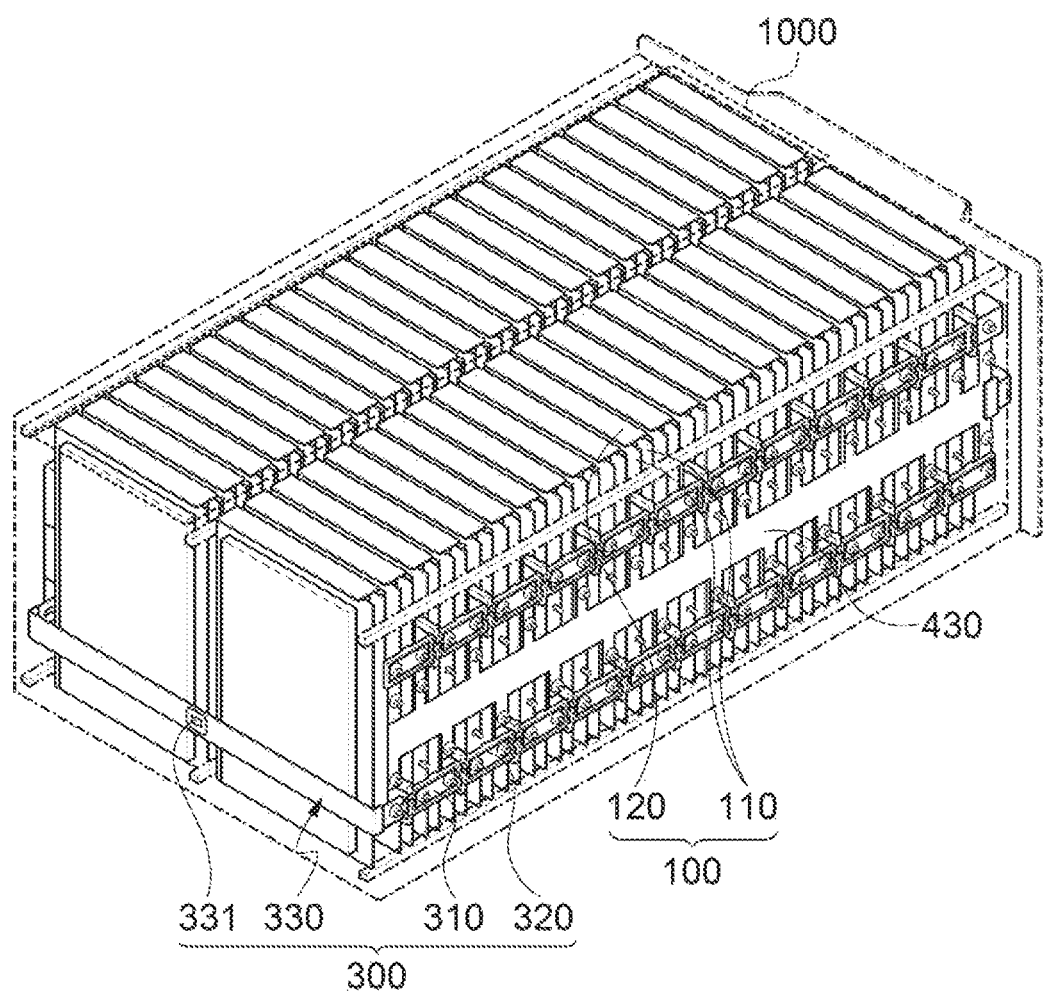
FIG. 6 is a perspective view illustrating an internal configuration of the battery module included in the high voltage battery rack according to the embodiment of the present invention as seen from the rear.

FIG. 5 is a perspective view illustrating a state in which a rear surface of the battery module 10 included in the high voltage battery rack 1 according to the embodiment of the present invention is disassembled as seen from the rear, and FIG. 6 is a perspective view illustrating an internal structure of the battery module 10 included in the high voltage battery rack 1 according to one embodiment of the present invention as seen from the rear. Meanwhile, for the convenience of description, the components such as the front cover unit 210, the rear cover unit 220, the plurality of battery cells 110 in the battery module 10, and the frame for fixing the cooling member 120 are not illustrated in FIG. 6.

Referring to FIGS. 5 and 6, each of the battery modules 10 installed in the high voltage battery rack 1 according to the embodiment of the present invention may include the cell connection unit 300 which electrically connects the plurality of battery cells 110 with each other. The cell connection unit 300 may include a fusing bus bar 330 which electrically connects the battery groups 1000 on both sides of the battery module 10 with each other. That is, the fusing bus bar 330 may electrically connect the battery groups 1000 separately located on both sides of the battery module 10 with each other based on the direction in which the plurality of battery cells 110 are stacked.

At this time, the fusing bus bar 330 may include a rupture part 331 having an opening formed in at least a portion thereof. Thereby, if a short-circuit or an overcurrent occurs in each of the plurality of battery modules 10, the rupture part 331 is ruptured, such that the battery module 10 may be electrically broken, and an accident such as fire or explosion due to the short-circuit may be prevented.

Meanwhile, the fusing bus bar 330 may be located on one side of the front or rear of the battery module 10, and may be located on a side opposite to the side on which the MSD module 11 is located in each battery module 10 or on the same side. That is, as described above, when the MSD module 11 is located in front of the battery module 10, the fusing bus bar 330 may be located on the rear surface of the battery module 10 or located on the front surface.

Specifically, the rear cover unit 220 of the battery module 10 may include a rear cover member 222 located on the side in which the plurality of battery cells 110 are located, which may protect the battery cells 110 located in rear of the battery module 10 when the fusing bus bar 330 is ruptured. That is, the rear cover unit 220 is located at the outermost position in rear of the battery module 10, and together with the front cover unit 210, protects a cell cover member 221 that fixes and supports the plurality of battery cells 110 and the fusing bus bar 330 from external foreign matters. Briefly, the cell cover member 221 and the rear cover member 222 may be located with the fusing bus bar 330 interposed therebetween. The cell cover member 221 is disposed between the fusing bus bar 330 and the plurality of battery cells 110 to protect the battery cells 110 from a rupture of the fusing bus bar 330.

In addition, the rear cover unit 220 may include a fusing bus bar cover 223 formed so as to surround the fusing bus bar 330 and located between the rear cover member 222 and the fusing bus bar 330. At this time, the fusing bus bar cover 223 may be made of an insulation material such as plastic, and may be located at an outer surface of the fusing bus bar 330.

Thereby, when a short-circuit occurs in the battery module 10, the rupture part 331 of the fusing bus bar 330 is melted, thereby preventing a secondary short-circuit accident that may occur due to the fusing bus bar 330 being adhered to the outer rear cover member 222.

Further, the fusing bus bar cover 223 may include a protrusion 2230 which is formed by protruding at least a portion of the fusing bus bar cover 223 to the rear cover member 222 side. The rear cover member 222 may have an opening part 2220 formed by penetrating at least a portion thereof at a position corresponding to the protrusion 2230 so that the protrusion 2230 may be inserted and removed. At this time, the protrusion 2230 and the opening part 2220 may be formed corresponding to the position in which the rupture part 331 of the fusing bus bar 330 is formed. Further, by forming the opening part 2220 in the rear cover member 222, if the fusing bus bar 330 is ruptured due to an internal short-circuit or an overcurrent, it is possible to prevent a part of the ruptured fusing bus bar 330 from coming into contact with the rear cover member 222, or a secondary short-circuit accident that may occur a deformation of the fusing bus bar cover 223 due to the rupture. That is, since the opening part 2220 is formed on the rear cover member 222, it is possible to prevent the fusing bus bar 230 from coming into contact with the rear cover member 222, or the secondary short-circuit accident.

As described above, since the fusing bus bar cover 223 is coupled to the rear cover member 222 and is fixed and supported in place, it is possible to prevent the fusing bus bar cover 223 from being detached from the fusing bus bar 330 or the like during operations such as transportation and installation of the battery module 10.

Meanwhile, the fusing bus bar cover 223 may be made of a transparent material.

When a short-circuit occurs in the battery module 10, the user or operator may visually and directly confirm the direct ruptured state of the fusing bus bar 230, or whether the fusing bus bar 230 is deformed due to the rupture of the fusing bus bar 330 through the opening part 2220 formed in the rear cover member 222, as well as intuitively confirm an occurrence of a short-circuit of the battery module 10. Therefore, the possibility of occurrence of a safety accident due to an internal short-circuit of the battery module 10 may be minimized.

Table 1 below shows the preferred dimension of cross-sectional areas of the rupture part 331 formed in the fusing bus bar 330 according to an amount of current when the plurality of battery cells 110 in the battery module 10 are connected in series. That is, the dimension of the cross-sectional area of the fusing bus bar 330 may be selected according to a rated current of 0 to 1 kA and a short-circuit current of 0.1 to 100 kA of the battery module 10 unit. For example, in a case of a battery module 10 through which a current of 93 A flows, the cross-sectional area of the rupture part 331 of the fusing bus bar 330 may be determined to be 14 mm$^2$.

TABLE 1

| Cross-sectional area of rupture part 331 (mm$^2$) | Maximum rated current (A) | Maximum short-circuit current (A) |
|---|---|---|
| 6 | 55 | 3300 |
| 8 | 70 | 4200 |
| 10 | 85 | 5100 |
| 16 | 120 | 7200 |
| 25 | 150 | 9000 |
| 35 | 195 | 11700 |
| 50 | 250 | 15000 |
| 70 | 300 | 18000 |
| 95 | 360 | 21600 |
| 120 | 420 | 25200 |
| 150 | 480 | 28800 |
| 185 | 570 | 34200 |
| 240 | 670 | 40200 |
| 300 | 780 | 46800 |
| 400 | 950 | 57000 |
| 500 | 1100 | 66000 |
| 628 | 1300 | 78000 |
| 800 | 1500 | 90000 |
| 1000 | 1800 | 108000 |

Figure 7:
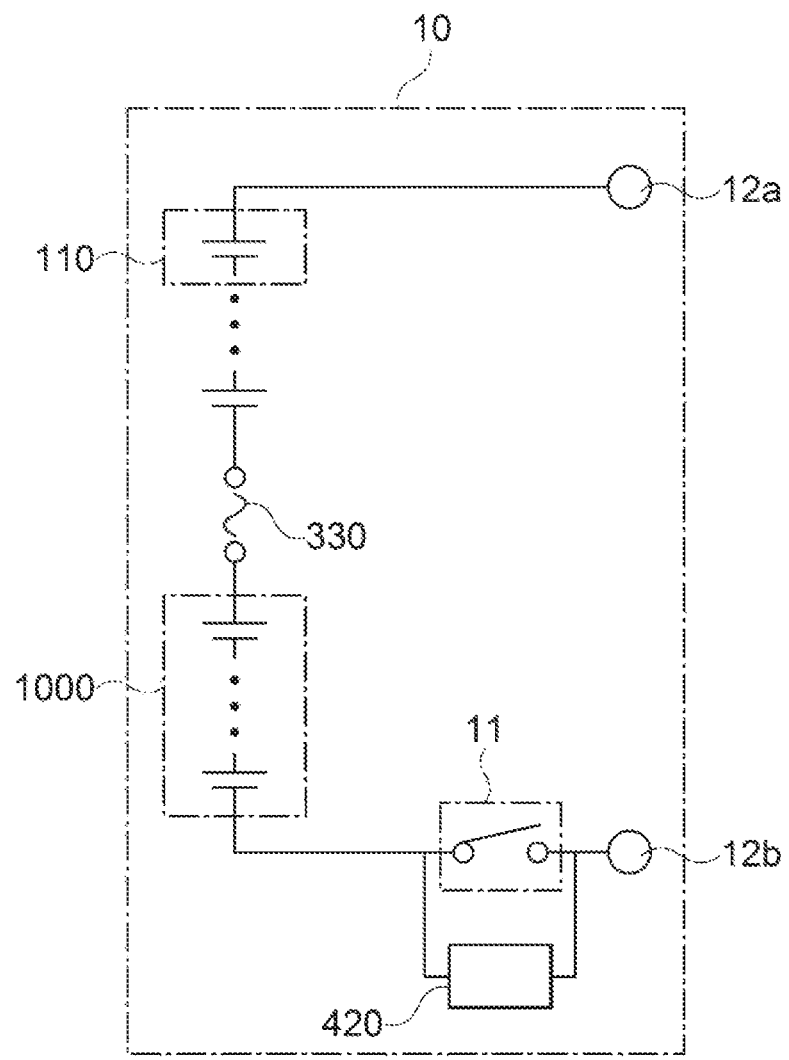
FIG. 7 is a circuit diagram illustrating an example of an electrical connection relationship of the battery module included in the high voltage battery rack according to the embodiment of the present invention.

FIG. 7 is a circuit diagram illustrating an example of an electrical connection relationship of the battery module 10 included in the high voltage battery rack 1 according to the embodiment of the present invention.

Referring to FIG. 7, the plurality of battery cells 110 may be connected in series with each other to form one battery group 1000, and two battery groups 1000 may be electrically connected with each other by the fusing bus bar 330.

In addition, the MSD module 11 is formed on the second terminal 12b side, such that the electrical connection of the battery module 10 therewith may be broken during operation, and it is possible to determine whether a high voltage is applied to the external terminal 12. Meanwhile, whether the MSD module 11 is opened or closed may be monitored by the BMS module 420. As described above, opening/closing information of the MSD module 11 may be transmitted to the rack controller 30 to release the contact state of the contactor 32 of the rack controller 30.

Figure 8:
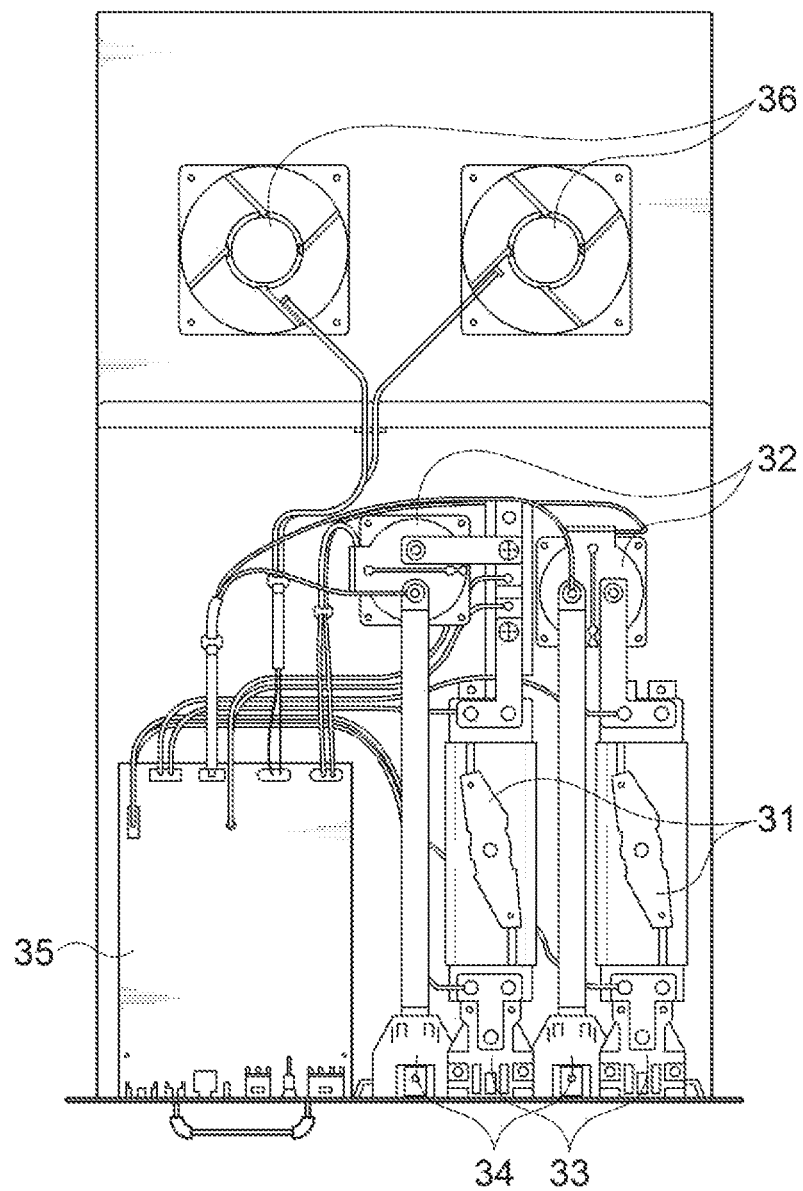
FIG. 8 is a schematic view illustrating an internal configuration of a rack controller of the high voltage battery rack according to the embodiment of the present invention.

FIG. 8 is a diagram illustrating an internal configuration of the rack controller 30 of the high voltage battery rack 1 according to the embodiment of the present invention.

Referring to FIG. 8, the rack controller 30 of the high voltage battery rack 1 according to the embodiment of the present invention may include a cooling fan 36 for cooling the plurality of battery modules 10, the contactor 32, the module terminal 33 connected with the battery module 10 side, and the rack terminal 34 for electrical connection with the external device 2.

In this case, the rack controller 30 may further include a rack control module 35 which is connected to the cooling fan 36, the contactor 32, the module terminal 33 and the rack terminal 34, respectively, to transmit and receive control signals.

In addition, the rack controller 30 may further include a rack fuse 31 which electrically connects the module terminal 33 and the contactor 32. At this time, if a short-circuit occurs in the entire high voltage battery rack 1, the rack fuse 31 is ruptured, and thereby a risk of a short-circuit accident such as a fire or explosion may be prevented As described above, the high voltage battery rack 1 according to the embodiment of the present invention includes, in addition to the fusing bus bar 330 located in each of the plurality of battery modules 10, the rack fuse 30 located in the rack controller 30 of the entire high voltage battery rack 1, respectively. Due to characteristics of the high voltage battery rack 1, to which a high voltage much higher than that of the battery pack for the typical electric vehicle is applied, a damage of human life may be increased when a short-circuit accident occurs. On the other hand, since the high voltage battery rack 1 according to the embodiment of the present invention has the double safety device, it is possible to minimize the possibility of safety accidents that may occur during installation or use of the high voltage battery rack 1 due to the multiple safety devices provided therein.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the embodiments, but be defined by the appended claims as well as equivalents thereof.

DESCRIPTION OF REFERENCE NUMERALS

1: High voltage battery rack
2: External device
10: Battery module
11: MSD module
11a: Module switch part
12: External terminal
12a: First terminal
12b: Second terminal
20: Connection member
30: Rack controller
31: Rack fuse
32: Contactor
33: Module terminal
34: Rack terminal
35: Rack control module
36: Cooling fan
40: Housing
100: Battery submodule
110: Battery cell
120: Cooling member
1000: Battery group
200: Protective cover unit
210: Front cover unit
220: Rear cover unit
221: Cell cover member
222: Rear cover member
2220: Opening part
223: Fusing bus bar cover
2230: Protrusion
230: Side cover unit
300: Cell connection unit
310: Bus bar member
320: Bus bar frame
330: Fusing bus bar
331: Rupture part
410: High voltage connection member
420: BMS module
430: Circuit unit

What is claimed is:

1. A high voltage battery rack, comprising:
a plurality of battery modules electrically connected with each other,
wherein each of the plurality of battery modules comprises:
external terminals; and
an MSD (Manual Service Device) module configured to determine whether a voltage of the plurality of battery modules is applied to the external terminals during operation,
wherein one end of the MSD module is connected to the plurality of battery modules and another end of the MSD module is connected to one of the external terminals,
wherein each of the plurality of battery modules comprises a plurality of battery cells stacked on each other,
wherein each of the plurality of battery modules comprises a cell connection unit which electrically connects the plurality of battery cells with each other, and
wherein the cell connection unit comprises a fusing bus bar, the fusing bus bar including a rupture part having an opening formed in at least a portion thereof, and when a short-circuit occurs of the plurality of battery modules, the rupture part is ruptured.

2. The high voltage battery rack according to claim 1, wherein the MSD module is manually operated by a user.

3. The high voltage battery rack according to claim 1, wherein the MSD module is exposed to an outside of the plurality of battery modules.

4. The high voltage battery rack according to claim 1, further comprising:
a rack controller configured to control the plurality of battery modules,
wherein the rack controller includes contactors which connects the plurality of battery modules and thean external device to form a current path therebetween.

5. The high voltage battery rack according to claim 4, wherein, when the MSD module breaks the voltage applied to the external terminals, the contractors of the rack controller break the current path between the plurality of battery modules and the external device.

6. The high voltage battery rack according to claim 1, wherein each of the plurality of battery modules further comprises a fusing bus bar cover made of an insulation material and located at an outer surface of the fusing bus bar.

7. The high voltage battery rack according to claim 1, wherein each of the plurality of battery modules further comprises a rear cover member located at an outermost side of the fusing bus bar, and the rear cover member includes an opening part formed therein to confirm a state of the fusing bus bar from an outside and prevent a second short-circuit.

8. The high voltage battery rack according to claim 1, wherein a cell cover member is disposed between the fusing bus bar and the plurality of battery cells to protect the plurality of battery cells from a rupture of the fusing bus bar.

9. The high voltage battery rack according to claim 1, wherein the fusing bus bar and each of the plurality of battery modules arei located in a direction in which the plurality of battery cells are stacked in the plurality of battery modules.

10. The high voltage battery rack according to claim 1, further comprising:
a rack controller configured to control the plurality of battery modules,
wherein the rack controller comprises a rack fuse located on a current path between the plurality of battery modules and an external device.

* * * * *